United States Patent
Zhang et al.

(10) Patent No.: US 11,643,338 B2
(45) Date of Patent: May 9, 2023

(54) METHOD AND DEVICE FOR PRODUCING LITHIUM TRANSITION METAL OXIDE

(71) Applicant: SHANDONG ZSTONE NEW MATERIAL TECHNOLOGY CO., LTD., Shandong (CN)

(72) Inventors: Huibin Zhang, Shandong (CN); Ying Wang, Shandong (CN); Jinfu Wang, Shandong (CN); Longwei Niu, Shandong (CN); Hongdong Zhao, Shandong (CN)

(73) Assignee: SHANDONG ZSTONE NEW MATERIAL TECHNOLOGY CO., LTD., Shandong (CN)

( * ) Notice: Subject to any disclaimer, the term of this patent is extended or adjusted under 35 U.S.C. 154(b) by 298 days.

(21) Appl. No.: 16/955,777

(22) PCT Filed: Dec. 2, 2019

(86) PCT No.: PCT/CN2019/122375
§ 371 (c)(1),
(2) Date: Jun. 19, 2020

(87) PCT Pub. No.: WO2021/082166
PCT Pub. Date: May 6, 2021

(65) Prior Publication Data
US 2022/0135430 A1 May 5, 2022

(30) Foreign Application Priority Data
Oct. 29, 2019 (CN) .......................... 201911038407.2

(51) Int. Cl.
*C01G 53/00* (2006.01)
*B01J 6/00* (2006.01)
(Continued)

(52) U.S. Cl.
CPC .............. *C01G 53/50* (2013.01); *B01J 6/001* (2013.01); *B01J 8/0055* (2013.01); *B01J 8/24* (2013.01);
(Continued)

(58) Field of Classification Search
CPC .... B01J 2208/00176; B01J 2208/00548; B01J 6/001; B01J 8/0055; B01J 8/24;
(Continued)

(56) References Cited

U.S. PATENT DOCUMENTS

| 6,875,416 B1 | 4/2005 | Benz et al. |
| 2003/0052434 A1 | 3/2003 | Hockman et al. |

(Continued)

FOREIGN PATENT DOCUMENTS

| CN | 1284932 A | 2/2001 |
| CN | 1710735 A | 12/2005 |

(Continued)

OTHER PUBLICATIONS

Machine Translation CN205073985U (Year: 2016).*
(Continued)

*Primary Examiner* — Victoria H Lynch
(74) *Attorney, Agent, or Firm* — Yue (Robert) Xu; Apex Attorneys at Law, LLP

(57) ABSTRACT

Provided is a method for producing a lithium transition metal oxide, comprising, A) mixing a lithium salt and a precursor, adding the mixture into a reactor for precalcination; the lithium salt has a particle size D50 of 10-20 μm and the precursor has a particle size D50 of 1-20 μm, and the precursor is one or more selected from transition metal oxyhydroxide, transition metal hydroxide and transition metal carbonate; and B) adding the product obtained from the precalcination into a fluidized bed reactor, subjecting to a first calcination and a second calcination to obtain the (Continued)

lithium transition metal oxide. Raw materials for the lithium transition metal oxide further includes a main-group metal compound containing oxygen, which is added in the pre-calcination, the first calcination or the second calcination; and the main-group metal compound containing oxygen has an average particle size of 10-100 nm. A fluidized bed reactor is also provided.

8 Claims, 8 Drawing Sheets

(51) Int. Cl.
*B01J 8/00* (2006.01)
*B01J 8/24* (2006.01)

(52) U.S. Cl.
CPC ............... *B01J 2208/00176* (2013.01); *B01J 2208/00548* (2013.01); *C01P 2002/72* (2013.01); *C01P 2004/03* (2013.01); *C01P 2004/61* (2013.01); *C01P 2004/64* (2013.01)

(58) Field of Classification Search
CPC .... C01G 45/1221; C01G 51/42; C01G 53/42; C01G 53/50; C01P 2002/72; C01P 2004/03; C01P 2004/51; C01P 2004/61; C01P 2004/64; C01P 2006/11; C01P 2006/12; C01P 2006/40
See application file for complete search history.

(56) References Cited

U.S. PATENT DOCUMENTS

| | | | |
|---|---|---|---|
| 2010/0196761 | A1 | 8/2010 | Tatsumi et al. |
| 2017/0253494 | A1 | 9/2017 | Garella et al. |
| 2017/0294645 | A1 | 10/2017 | Shin et al. |
| 2017/0338469 | A1 | 11/2017 | Volkov et al. |
| 2018/0026268 | A1 | 1/2018 | Kim et al. |

FOREIGN PATENT DOCUMENTS

| | | |
|---|---|---|
| CN | 101804314 A | 8/2010 |
| CN | 101836314 B | 8/2013 |
| CN | 205073985 U | 3/2016 |
| CN | 105642196 A | 6/2016 |
| CN | 107001068 A | 8/2017 |
| CN | 107001072 A | 8/2017 |
| CN | 107074588 A | 8/2017 |
| CN | 109244365 A | 1/2019 |
| CN | 110015699 A | 7/2019 |
| CN | 110112400 A | 8/2019 |
| EP | 1373140 B1 | 4/2005 |
| JP | 2018014326 A | 1/2018 |
| JP | 2018502035 A | 1/2018 |
| KR | 20170088848 A | 8/2017 |

OTHER PUBLICATIONS

Machine Translation CN101804314A (Year: 2010).*
International Search Report for PCT/CN2019/122375 dated May 27, 2020, ISA/CN.
Advances in Polymer Electrolytes for Complex Lithium Batteries, Xianjun et al, Science and Technology Innovation Herald, Jul. 21, 2019, No. 21, pp. 110-111.
Synthesis and Electrochemical Performances of Iron Trifluoride Cathode Materials for Lithium Ion Batteries, Qiao Wen-can, Zhao Cheng-long, Wang Ying, 2019.8 vol. 43 No. 8 Chinese Journal of Power Sources (CJPS).
The First Office Action of the Chinese priority Application No. 201911038407.2 dated May 8, 2020.
The First Office Action for the Japanese Application No. 2020-533074, dated Jan. 25, 2022.
The First Office Action of the Korean Application No. 10-2020-7019881, dated Oct. 1, 2021.

* cited by examiner

METHOD AND DEVICE FOR PRODUCING LITHIUM TRANSITION METAL OXIDE

CROSS REFERENCE TO RELATED APPLICATIONS

This application is a U.S. National Phase application based upon PCT Application No. PCT/CN2019/122375, filed Dec. 2, 2019, which claims the priority of Chinese Patent Application No. 201911038407.2, filed on Oct. 29, 2019, and titled with "METHOD AND DEVICE FOR PRODUCING LITHIUM TRANSITION METAL OXIDE", and the disclosures of which are hereby incorporated by reference.

FIELD

The present disclosure relates to the field of lithium battery technology, specifically to method and device for producing a lithium transition metal oxide.

BACKGROUND

The new energy battery industry has greatly eased global energy consumption and environmental protection issues. The lithium transition metal oxide is an important part of the new energy battery and has a broad market value.

At present, a well-known method for producing a lithium transition metal oxide is crucible method, comprising: mixing the precursor and the lithium compound into a crucible, calcining the mixture at a high temperature in a roller hearth furnace, then subjecting to pulverization, washing, filtration, surface drying, coating, secondary calcination, secondary pulverization, screening, demagnetization, and batch mixing to give a powder product. The process of this method is complicated, there are many production control points, and the production efficiency is low. In addition, the size of the crucible is limited, and the filling height is limited. The scale-up production based on the roller hearth furnace method results in high investment costs.

SUMMARY

An object of the present disclosure is to provide a method and device for preparing a lithium transition metal oxide. The method of the present disclosure has high production efficiency, and the obtained lithium transition metal oxide has good particle size uniformity, regular morphology, and excellent electrochemical performance.

The present disclosure provides a method for preparing a lithium transition metal oxide, comprising, A) mixing a lithium salt and a precursor, and adding the resultant mixture into a reactor for precalcination;

the lithium salt has a median particle size D50 of 10-20 µm and the precursor has a median particle size D50 of 1-20 µm, and the precursor is one or more selected from the group consisting of transition metal oxyhydroxide, transition metal hydroxide and transition metal carbonate; and B) adding the product obtained from the precalcination into a fluidized bed reactor, subjecting to a first calcination and a second calcination successively to obtain the lithium transition metal oxide; and raw material for preparing the lithium transition metal oxide further includes a main-group metal compound containing oxygen, which is added after the addition of the lithium salt and the precursor in the precalcination, the first calcination or the second calcination; and the main-group metal compound containing oxygen has an average particle size of 10-100 nm.

Preferably, the temperature of the precalcination is 50-150° C.;

and the duration of the precalcination is 1-10 h.

Preferably, the metal in the main-group metal compound containing oxygen is one or more selected from the group consisting of aluminum, titanium, magnesium, vanadium, cerium, zirconium and molybdenum.

Preferably, the mole ratio of the amount of the lithium salt, the precursor and the main-group metal compound containing oxygen is (1.01-1.10):1:(0.001-0.01).

Preferably, in the precalcination, the airflow velocity of the fluidized bed reactor is 1-10 cm/s, in the first calcination, the airflow velocity of the fluidized bed reactor is 5-15 cm/s; and in the second calcination, the airflow velocity of the fluidized bed reactor is 10-20 cm/s.

Preferably, the temperature of the first calcination is 150-800° C.; and the duration of the first calcination is 2-10 h.

Preferably, the temperature of the second calcination is 500-1000° C.; and the duration of the second calcination is 5-20 h.

The present disclosure provides a fluidized bed reactor, wherein an expansion segment is provided in the upper part of the fluidized bed reactor, and an entirely-surrounded heating unit is provided outside the fluidized bed reactor;

the shape of the bottom sealing head of the fluidized bed reactor is spherical, ellipsoidal, circular or conical; an air intake port is provided above the bottom sealing head; and the opening of the air intake port is towards the bottom sealing head of the fluidized bed reactor; and an air outlet tube and a cyclone separator are provided at the top of the fluidized bed reactor, and the exit of the air outlet tube is connected to the cyclone separator.

Preferably, a lining is provided inside the fluidized bed reactor, and the lining is a ceramic lining.

Preferably, the fluidized bed reactor has a diameter of 0.1-10 m, and the expansion segment has a diameter of 0.1-20 m.

The present disclosure provides a method for preparing a lithium transition metal oxide, comprising, A) mixing a lithium salt and a precursor, and adding the resultant mixture into a reactor for precalcination; the lithium salt has a median particle size D50 of 10-20 µm and the precursor has a median particle size D50 of 1-20 µm, and the precursor is one or more selected from the group consisting of lithium transition metal oxyhydroxide, lithium transition metal hydroxide and transition metal carbonate; and B) adding the product obtained from the precalcination into a fluidized bed reactor, subjecting to a first calcination and a second calcination successively to obtain the lithium transition metal oxide. raw material for preparing the lithium transition metal oxide further includes a main-group metal compound containing oxygen, which is added after the addition of the lithium salt and the precursor in the precalcination, the first calcination or the second calcination; and the main-group metal compound containing oxygen has an average particle size of 10-100 nm. Due to particles of micron-level are hard to be fluidized, nanometer-level main-group metal compound containing oxygen is added into micron-level lithium salt and precursor in the present disclosure. This fluidization technology gives the product better performances and better fluidization effect. In addition, the present disclosure further specifies the time point of adding the main-group metal compound containing oxygen, that is, after adding the lithium salt and the precursor and during the precalcination. This treatment can remove free water and crystal water in the lithium salt and precursor, giving the particles of intermediate product uniform particle size, regular morphology, low particle viscosity, and high reactivity. During fluidization, adding nanometer main-group metal compound containing oxygen makes the particle distribution more uniformly, reduces relative reaction time, lowers the Van der Waals' force between micron-level crude particles, reduces agglomeration, and further, makes lithium-insertion and coating and doping in crystal lattice of the product more uniform, and increases the uniformity of the product.

BRIEF DESCRIPTION OF DRAWINGS

In order to explain the technical solutions in the embodiments of the present disclosure or the conventional art more clearly, the drawings used in the description of the embodiments or the conventional art will be briefly introduced below Obviously, the drawings in the following description are only embodiments of the present disclosure. For one of ordinary skill in the art, other drawings can be obtained according to the provided drawings without paying creative labor.

DETAILED DESCRIPTION

Figure 1:
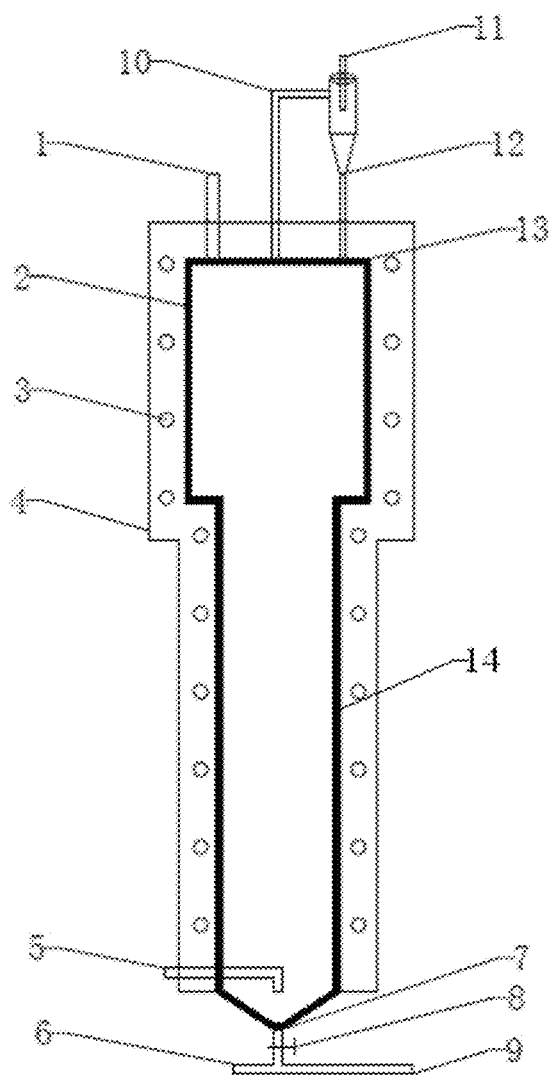
FIG. 1 is a structure representation of the fluidized bed reactor of the present disclosure; wherein 1 is a feed port, 2 is an expansion segment, 3 is an entirely-surrounded heating unit, 4 is an outer insulating layer, 5 is an air intake port, 6 is a pneumatic conveying air intake port, 7 is a discharge port, 8 is an automatic discharge valve, 9 is a material conveying tube, 10 is an air outlet tube, 11 is an air outlet tube of cyclone separator, 12 is a dipleg of cyclone separator, 13 is a fluidized bed reactor lining, and 14 is body of the fluidized bed.

The present disclosure provides a method for preparing a lithium transition metal oxide, comprising, A) mixing a lithium salt and a precursor, and adding the resultant mixture into a reactor for precalcination;

the lithium salt has a median particle size D50 of 10-20 μm and the precursor has a median particle size D50 of 1-20 μm, and the precursor is one or more selected from the group consisting of lithium transition metal oxyhydroxide, lithium transition metal hydroxide and transition metal carbonate; and B) adding the product obtained from the precalcination into a fluidized bed reactor, subjecting to a first calcination and a second calcination successively to obtain the lithium transition metal oxide; and raw material for preparing the lithium transition metal oxide further includes a main-group metal compound containing oxygen, which is added after the addition of the lithium salt and the precursor in the precalcination, the first calcination or the second calcination; and the main-group metal compound containing oxygen has an average particle size of 10-100 nm.

In the present disclosure, the lithium salt and precursor are preferably mechanically mixed firstly, and then put in a reactor for precalcination.

The lithium salt is preferably one or more selected from lithium carbonate, lithium hydroxide, lithium sulfate, lithium acetate, lithium nitrate, lithium chloride, and lithium fluoride, more preferably lithium carbonate and/or lithium hydroxide. The precursor is preferably one or more selected from transition metal oxyhydroxide, transition metal hydroxide and transition metal carbonate. The transition metal oxyhydroxide or transition metal hydroxide is preferably one or more selected from nickel hydroxide, cobalt hydroxide, manganese hydroxide, nickel-cobalt-aluminum hydroxide, and nickel-cobalt-manganese hydroxide. The transition metal carbonate is preferably one or more selected from cobalt carbonate, nickel carbonate, manganese carbonate, nickel-cobalt-aluminum carbonate, and nickel cobalt-manganese compounds.

In the present disclosure, the lithium salt and the precursor are preferably micron-level, and the lithium salt preferably has a particle size of 12-15 μm, and the precursor preferably has a particle size of 8-12 μm.

In the present disclosure, the reactor for precalcination is preferably a fluidized bed reactor, a moving bed reactor, a fixed bed reactor, a stirred bed reactor, a rotary furnace, a rotary bed furnace, a pendulum kiln, a roller hearth furnace or a tunnel kiln, preferably a fluidized bed reactor.

In the present disclosure, the temperature of the precalcination is preferably 50-150° C., more preferably 100-150° C.; and the duration of the precalcination is 1-10 h, more preferably 2-8 h. The heating manner is radiation heat transmission. The heating rate is preferably 1-10° C./min, more preferably 5-8° C./min.

In the present disclosure, the precalcination is carried out in oxygen atmosphere. The oxygen is preferably high-purity oxygen. The flow velocity of oxygen is preferably 1-10 cm/s, more preferably 5-6 cm/s.

In the precalcination process, the mixture is heated in a fluidized state, and water on the surface of the solid and crystal water of the lithium salt are removed. The evaporating temperature of water on the surface of the solid is 100° C., and the dehydrating temperature of crystal water in the lithium salt is 150° C. The removed water becomes gas. Due to the gas-solid contact area is relatively large in the fluidization state, water is quickly taken away from the surface of the solid. In the calcination process, due to evaporation of water, the surface and capillary pores of solid particles are exposed, forming a solid-liquid interface. Due to capillary force, the phase interface shrinks and the particles are brought into close contact, and the hydroxyl groups on the surface of the solid particles form hydrogen bonds. With the removal of water, the two non-bridged hydroxyl groups spontaneously change to —O— chemical bonds, forming agglomeration. Agglomeration can cause fine powder particles become bigger, and the size and morphology are uncontrollable.

During the precalcination, removing free water and crystal form water can take away a large amount of heat, lowering the energy consumption in the following process. During the fluidization of particles, removing of water can reduce the occurrence of agglomeration. Reduce of agglomeration and fluidization of solid particles make the particle size and morphology uniform. Removing water can reduce stickiness of solid particles. Removing crystal form water can reduce crystal size of the lithium salt, and increase reactive activity. And solid particles that are not easy to agglomerate and have lowered stickiness facilitate a stable fluidized state.

After the above precalcination, the product after the precalcination is conveyed to next fluidized bed reactor through a pipe to perform the first calcination. Preferably, the fluidized bed reactor for the first calcination has the same size and structure as the fluidized bed reactor for the precalcination.

In the present disclosure, the temperature of the first calcination is preferably 150-800° C., more preferably 200-700° C., and most preferably 300-600° C. Specifically, in examples of the present disclosure, the temperature may be 500° C. The duration of the first calcination is preferably 1-10 h, more preferably 2-8 h, and most preferably 3-5 h. The first calcination is preferably carried out in an oxygen atmosphere. The oxygen is preferably high-purity oxygen. The flow velocity of the oxygen is preferably 5-15 cm/s, and more preferably 8-10 cm/s.

After the first calcination, the product of the first calcination is conveyed to next fluidized bed reactor through a pipe to perform the second calcination. Preferably, the fluidized bed reactor for the second calcination has the same size and structure as the fluidized bed reactor for the first calcination.

In the present disclosure, the temperature of the second calcination is preferably 500-1000° C., more preferably 600-900° C., and most preferably 700-800° C. Specifically, in examples of the present disclosure, the temperature may be 730° C. The duration of the second calcination is preferably 5-20 h, and more preferably 10-15 h. The second calcination is preferably carried out in an oxygen atmosphere. The oxygen is preferably high-purity oxygen. The flow velocity of the oxygen is preferably 10-20 cm/s, and more preferably 15 cm/s.

In the production process of the present disclosure, in order to improve electrochemical performance and fluidization performance of the raw materials, nano-level main-group metal oxide is preferably added. Adding oxygen-containing metal compound may give the product better performances and better fluidization effect. 1) The oxygen-containing metal compound is nano-level powders. In the present disclosure, the product is coated by fluidization technology, which increases the contact area between different materials, making the coating more evenly. 2) The product has a larger free space in a fluidization state, decreasing the damage to the product and increasing the circulation performance of product. 3) The precursor and the lithium salt are micron-level powder materials. Adding oxygen-containing metal compound decreases Van der Waal's force between micron-level crude particles, decreases stickiness of the materials and improve the fluidization performance thereof.

In the present disclosure, after adding the lithium salt and precursor into the reactor, main-group metal compound containing oxygen are further added, which may be added in the precalcination after the addition of the lithium salt and precursor, the first calcination or the second calcination. In the present disclosure, it is found that comparing with adding the lithium salt, the precursor and the main-group metal compound containing oxygen together, or using the main-group metal compound containing oxygen to perform the coating after the completion of second calcination, adding the main-group metal compound containing oxygen in the high-temperature reaction stage makes the compound distribute more evenly, the relative reaction time shorter, and decreases Van der Waal's force between micron-level crude particles, decreases agglomeration, and further makes the crystal lattice develop well and the coating and insertion more evenly, therefore improving the uniformity of product.

In the present disclosure, the chemical formulas of the lithium transition metal oxide prepared by the above method are $LiCoO_2$, $Li_2MnO_4$, $LiNiO_2$, $LiFePO_4$, and compounds such as $LiNi_xCo_yMn_{1-x-y}O_2$ and $LiNi_xCo_yAl_{1-x-y}O_2$, wherein x is 0.33-0.93, and y is 0-0.33. The obtained products have average particle size D50 of 1-20 μm, and specific surface area of 0.1-2.0 $m^2/g$.

The lithium transition metal oxide prepared by the present disclosure can be used for preparing polar plates of primary rechargeable batteries or secondary rechargeable batteries The present disclosure further provides a fluidized bed reactor, wherein
an expansion segment is provided in the upper part of the fluidized bed reactor, and an entirely-surrounded heating unit is provided outside the fluidized bed reactor;
the shape of the bottom sealing head of the fluidized bed reactor is spherical, ellipsoidal, circular or conical; an air intake port is provided above the bottom sealing head; and the opening of the air intake port is towards the bottom sealing head of the fluidized bed reactor; and
an air outlet tube and a cyclone separator are provided at the top of the fluidized bed reactor, and the exit of the air outlet tube is connected to the cyclone separator.

An air intake port is provided at the lower part of the fluidized bed reactor. The shape of the bottom sealing head of the fluidized bed reactor is spherical, ellipsoidal, circular or conical. The air intake pipe is directly opposite the head of the fluidized bed above the head to take in air. After the air is mixed back through the spherical, ellipsoidal or conical head, the mixed gas is mixed with the intake air again. The gas flow in the upper horizontal section of the air intake pipe tends to be evenly distributed, the gas flow direction is upward, and the upper solid material contacts in a uniform manner. This design is necessary for stable fluidization. And the side is designed with pressure measuring ports at different positions to monitor the internal material flow state, and adjust the flow rate and pressure at a reasonable range at any time to ensure the stable fluidization of solid materials.

The fluidized bed reactor of the present disclosure is a single reactor, which allows for reducing processing steps to improve reaction efficiency. After the material is transferred to the single-stage reactor through the pipeline, the discharge valve is opened according to the calcination time of the material, thereby ensuring the heat treatment time of the material and improving the batch consistency of the product.

The fluidized bed reactor is provided with an expansion segment. When the gas-solid mixture rises to the expansion segment, the gas velocity decreases, which causes the material to be forced downward and the material to perform a deceleration movement. After rising to a certain position, the material accelerates downward, and the material sinks below the expansion segment. The pipe diameter decreases, the gas velocity increases again, the material decelerates and decreases, and then accelerates and rises. The materials undergo a reciprocating upward and downward movement cycle, and heat exchange and material exchange are continuously performed between the particles, between the particles and the inner wall, which effectively increases the consistency of the product. In the present invention, the diameter ratio of the expansion segment to the non-expansion segment of the fluidized bed is preferably 1 to 2 times.

The fluidized bed reactor is provided with an entirely-surrounded heating unit, and an insulation layer is provided outside the heating device. The enclosed heating method greatly improves the uniformity of the internal temperature through thermal radiation. The heat of the internal solid material is all derived from thermal radiation, the heating efficiency is high, the heating rate of the solid material is controllable, and the gas velocity is allowed to be reduced. It can further reduce gas consumption, reduce unit energy consumption, and improve heat treatment efficiency. Further, the controllable heating rate can also be adjusted according to the characteristics of the ceramic lining material, reducing the damage to the ceramic material by the thermal shock, and reducing the risk of the magnetic foreign body being incorporated into the product due to the ceramic material falling off.

Heating units are provided outside the air intake port and feedstock tube of the fluidized bed reactor and an insulation layers are coated outside the heating units. These heating units can sufficiently preheat the inletting gas and material, and reducing thermal shock.

The height and diameter of the reactor can be adjusted according to production capacity requirements, and the diameter may be 0.1-10 m and the height 0.5-100 m. Based on the design of the reactor bottom and the solid material heat treatment step, it can be ensured that the material can also be stably fluidized in the reactor of the size, so a single-time filler having a diameter greater than 1 m can be achieved. In addition, the determination of the heating rate and the heat treatment time can achieve a single reactor throughput of nearly 100 tons, greatly improving the reaction efficiency, and the product is in a stable fluidization, and the product consistency is high.

A signal-controlled discharge valve is disposed at the lower part of the fluidized bed reactor, ensuring the automatic control of discharging process. A cyclone separator is disposed at the upper portion of the fluidized bed reactor. A small amount of particles brought by gas fall again into the fluidized bed reactor when passing by the cyclone separator, improving the yield of product.

In the fluidized bed reactor, a pneumatic conveyor is disposed under the opening valve. The material is discharged from the lower part of the reactor. The material is conveyed to a pipe coated with a heating layer by airflow, to carry out the next process.

The present disclosure provides a method for preparing a lithium transition metal oxide, comprising, A) mixing a lithium salt and a precursor, and adding the resultant mixture into a reactor for precalcination; the lithium salt has a median particle size D50 of 10-20 μm and the precursor has a median particle size D50 of 1-20 μm, and the precursor is one or more selected from the group consisting of lithium transition metal oxyhydroxide, lithium transition metal hydroxide and transition metal carbonate; and B) adding the product obtained from the precalcination into a fluidized bed reactor, subjecting to a first calcination and a second calcination successively to obtain the lithium transition metal oxide. raw material for preparing the lithium transition metal oxide further includes a main-group metal compound containing oxygen, which is added after the addition of the lithium salt and the precursor in the precalcination, the first calcination or the second calcination; and the main-group metal compound containing oxygen has an average particle size of 10-50 nm. Due to particles of micron-level are hard to be fluidized, nanometer-level main-group metal compound containing oxygen is added into micron-level lithium salt and precursor in the present disclosure. This fluidization technology gives the product better performances and better fluidization effect. In addition, the present disclosure further specifies the time point of adding the main-group metal compound containing oxygen, that is, after adding the lithium salt and the precursor and during the precalcination. This treatment can remove free water and crystal water in the lithium salt and precursor, giving the particles of intermediate product uniform particle size, regular morphology, low particle viscosity, and high reactivity. During fluidization, adding nanometer main-group metal compound containing oxygen makes the particle distribution more uniformly, reduces relative reaction time, lowers the Van der Waals' force between micron-level crude particles, reduces agglomeration, and further, makes lithium-insertion and coating and doping in crystal lattice of the product more uniform, and increases the uniformity of the product.

In order to further illustrate the present disclosure, a method and a device for preparing a lithium transition metal oxide compound provided by the present disclosure are described in detail below with reference to the examples, but it cannot be understood as limiting the protection scope of the present disclosure.

Example 1

A. 2.8 kg $LiOH \cdot H_2O$, 0.65 kg nanometer $Al(OH)_3$ and 6 kg $Ni_{0.8}Co_{0.1}Mn_{0.1}(OH)_2$ (average particle size of 10 micron) were added into a high-speed mixer and mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 5° C./min until 150° C., and then insulated for 2 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Example 1 was obtained, which was transferred to packaging workshop section by a pneumatic conveying system.

Example 2

A. 2.8 t $LiOH \cdot H_2O$, 0.65 t nanometer $Al(OH)_3$ and 6 t $Ni_{0.8}Co_{0.1}Mn_{0.1}(OH)_2$ (average particle size of 10 micron) were mixed.

B. The obtained mixture was added into a fluidized bed reactor A with a diameter of 1.6 m. The bottom shape of the reactor A was conical, and an entirely-surrounded heating unit was disposed outside the reactor A. The mixture was filled in the reactor A like a column as a bed layer with a depth of 5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 5° C./min until 150° C., and then insulated for 2 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Example 2 was obtained, which was transferred to packaging workshop section by a pneumatic conveying system.

Figure 2:
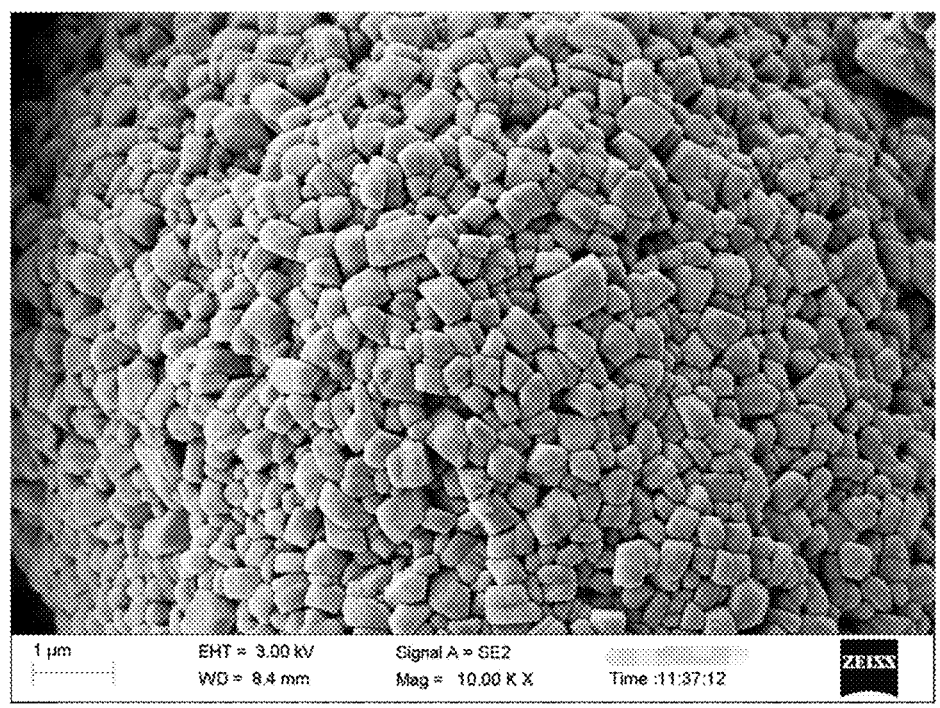
FIG. 2 is a SEM image of the lithium transition metal oxide obtained in Example 2 of the present disclosure.

FIG. 2 is a SEM image of the lithium transition metal oxide obtained in Example 2 of the present disclosure. It can be seen from FIG. 2 that the secondary particles have relatively smooth surface, and overall degree of sphericity of the particles is relatively high. The primary particles have relatively even size. The results indicate that the high temperature solid-phase reaction was relatively thoroughly conducted, and there was no oxidation defection.

Example 3

A lithium transition metal compound was prepared according to the steps in Example 1. The differences were that a fixed bed reactor was used in this Example to replace the fluidized bed reactor in Example 1, and the airflow velocity of "5 cm/s" in Example 1 was adjusted to "2 cm/s".

In the present disclosure, performances of the products obtained in Example 1 and Example 3 were compared, and the results were shown in Table 1 and Table 2. The results showed that when the amount of starting materials amplified 10 times, the physical performances and electrochemical performances of products in Example 1 and Example 2 were almost the same, solving the problem of large-scale production of lithium transition metal compound by fluidized bed technology.

TABLE 1

Physical performances of the products obtained in examples 1-3

| Number | Particle size distribution D10/D50/D90 | Tap density g/cm$^3$ | Specific surface area m$^2$/g | Fluidity | pH | Magnetic foreign body Fe/Cu ppm |
|---|---|---|---|---|---|---|
| Example 1 | 7.17/10.4/15.1 | 2.49 | 0.43 | Good | 12.11 | 11/0 |
| Example 2 | 7.01/10.5/15.3 | 2.45 | 0.52 | Good | 12.10 | 19/0 |
| Example 3 | 6.52/11.0/18.5 | 2.40 | 0.60 | Good | 12.06 | 18/0 |

TABLE 2

| | Electrochemical performances of the products obtained in examples 1-3 | | | | | |
|---|---|---|---|---|---|---|
| Number | Charging at 0.2 C mAh/g | Charging at 0.2 C mAh/g | Efficiency of the first cycle % | Discharging at 1 C of the first cycle mAh/g | Cycling at 1 C for 50 cycles mAh/g | Cycling Retention Rate (%) |
| Example 1 | 223.4 | 191.8 | 85.85 | 180.7 | 169.4 | 93.75 |
| Example 2 | 223.5 | 190.8 | 85.37 | 180.3 | 169.8 | 94.18 |
| Example 3 | 222.0 | 190.1 | 85.63 | 180.2 | 170.3 | 94.50 |

Comment: the conditions for electrochemical detections were: CR2032, 2.7-4.3 V vs. Li+/Li@RT.

Comparative Example 1

A. 2.8 kg $LiOH \cdot H_2O$, 0.65 kg nanometer $Al(OH)_3$ and 6 kg $Ni_{0.8}Co_{0.1}Mn_{0.1}(OH)_2$ (average particle size of 10 micron) were mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 10 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 1-10° C./min until 500° C., and then insulated for 5 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 15 cm/s to realize stable fluidization. The pressure fluctuation was detected and the value fluctuated within the range of ±500 pa. The calcination temperature was set to 730° C. and the calcination time was 10 h. A lithium transition metal oxide of Comparative Example 1 was obtained and transferred to packaging workshop section by a pneumatic conveying system.

Figure 3:
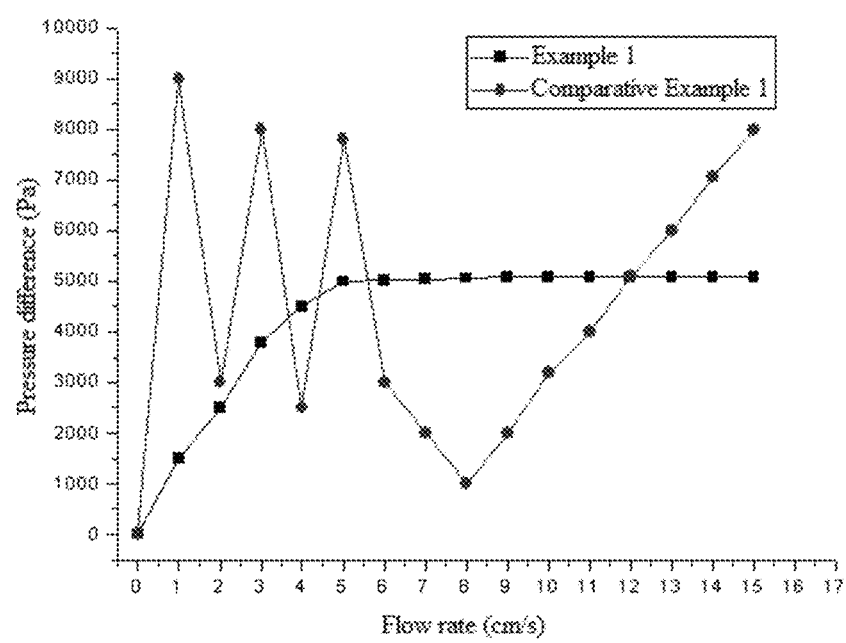
FIG. 3 is a comparison diagram of pressure differences during precalcination, the first calcination and the second calcination of Example 1 and Comparative Example 1 of the present disclosure.
Figure 4:
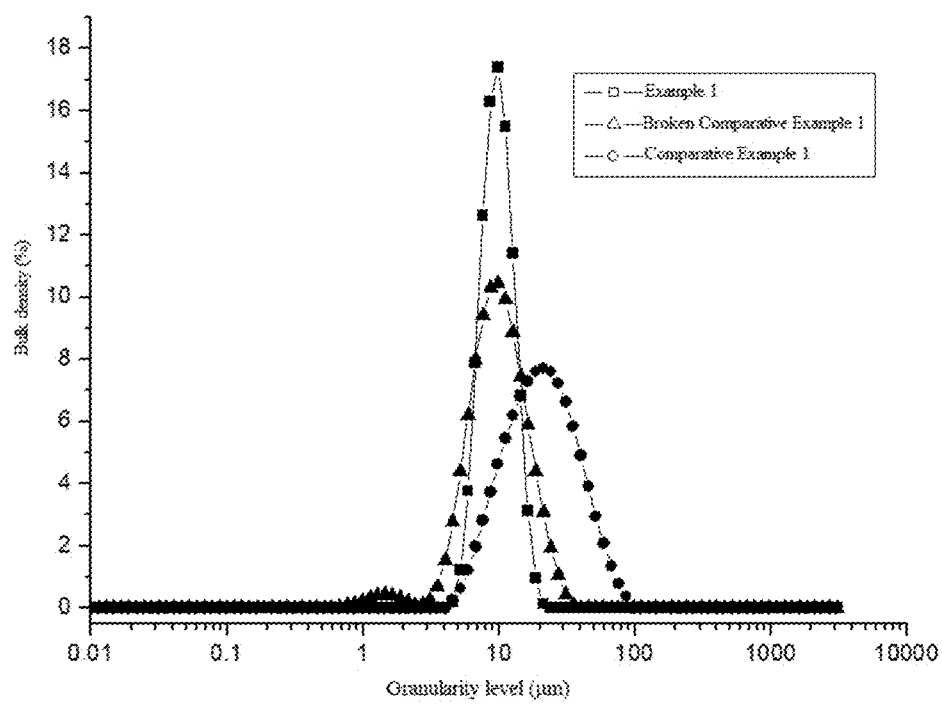
FIG. 4 is a comparison diagram of particle sizes of products in Example 1 and Comparative Example 1 of the present disclosure.
Figure 5:
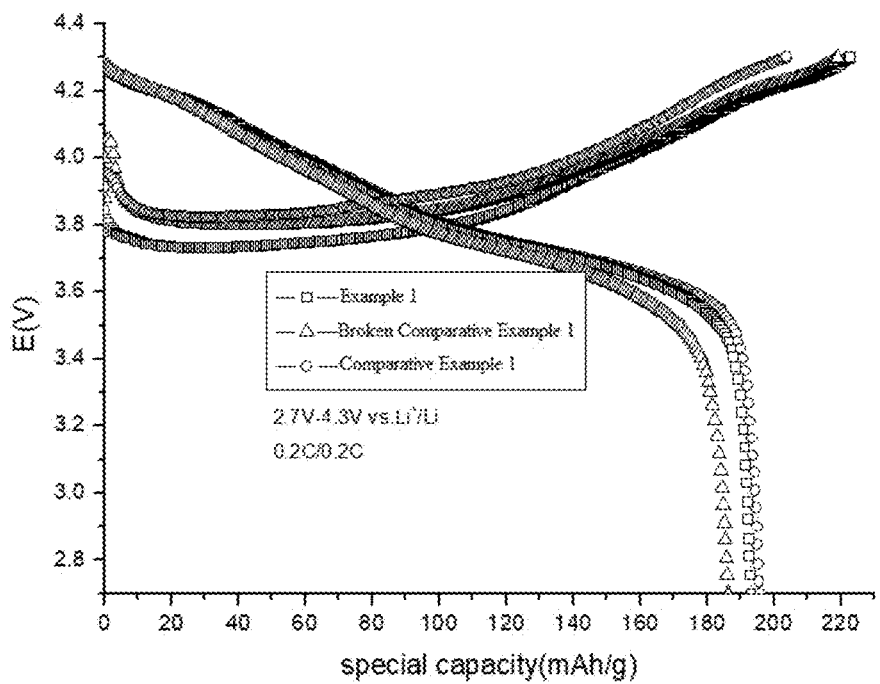
FIG. 5 is a comparison diagram of discharge capacity per gram of the products obtained in Example 1 and Comparative Example 1 of the present disclosure.
Figure 6:
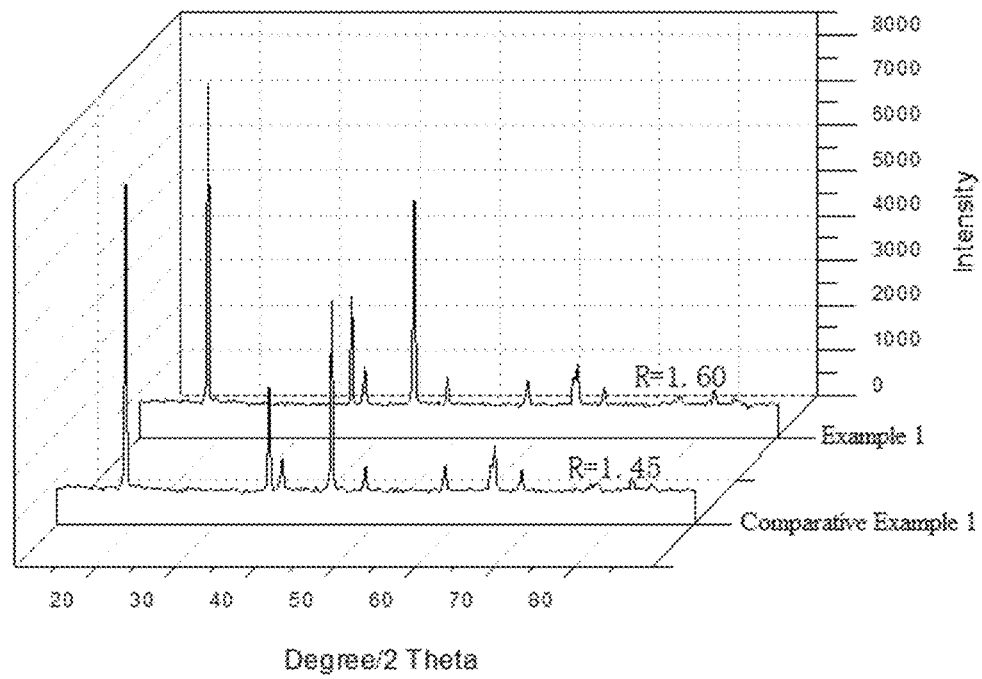
FIG. 6 is a XRD spectrogram of the products obtained in Example 1 and Comparative Example 1 of the present disclosure.

FIG. 3 is a comparison diagram of pressure differences during precalcination, the first calcination and the second calcination of Example 1 and Comparative Example 1 in the present disclosure. FIG. 4 is a comparison diagram of particle sizes of the products in Example 1 and Comparative Example 1 in the present disclosure. FIG. 5 is a comparison diagram of discharge capacity per gram of the products obtained in Example 1 and Comparative Example 1 in the present disclosure. FIG. 6 is XRD spectrogram of the products obtained in Example 1 and Comparative Example 1 in the present disclosure.

It can be seen from FIGS. 3-6 that in the Comparative Example 1 which was without the 150° C. precalcination process as that in Example 1, the dehydration was not sufficient during the preheating process. It can be concluded from the comparison diagram of pressure difference that piston and channeling were formed at low velocities; at high velocities, the pressure was relatively low, channelings were formed and it was impossible to form a stable fluidization state. It can be concluded from the particle size comparison diagram that agglomeration appeared in the final product. Particle agglomeration may lead to insufficient contact between secondary particles and gas. As shown in the XRD spectrogram, crystal form of Comparative Example 1 was not fully developed. In addition, during the charge-discharge, inserting and de-inserting distance of lithium ions were enlarged, causing poor discharge capacity per gram. Agglomerated particles need to be subjected to breaking process to improve electrochemical performances, which will add extra treatment and increase the cost.

Comparative Example 2

A. 2.8 kg $LiOH \cdot H_2O$, 0.65 kg nanometer $Al(OH)_3$ and 6 kg $Ni_{0.8}Co_{0.1}Mn_{0.1}(OH)_2$ (average particle size of 10 micron) were mixed.

B. The obtained mixture was added into a fluidized bed reactor A with a diameter of 0.16 m. The bottom of the reactor A was flat, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 5° C./min until 150° C., and then insulated for 2 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Comparative Example 2 was obtained, which was transferred to packaging workshop section by a pneumatic conveying system.

Figure 7:
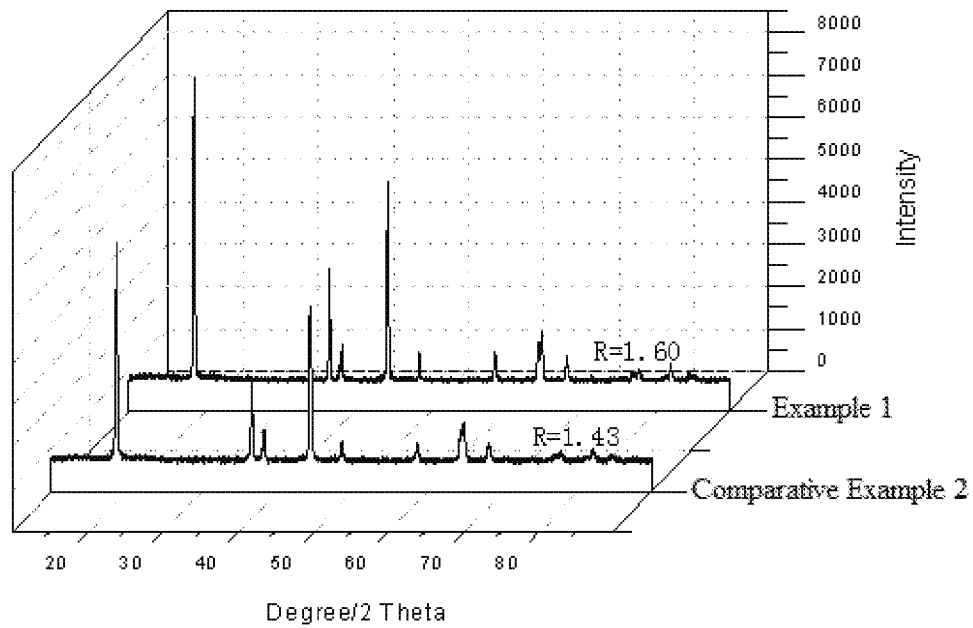
FIG. 7 is a XRD spectrogram of the products obtained in Example 1 and Comparative Example 2 of the present disclosure.

FIG. 7 is XRD spectrogram of the products obtained in Example 1 and Comparative Example 2 in the present disclosure. It can be concluded from FIG. 7 that when the bottom of the fluidized bed reactor in Comparative Example 2 was flat, the gas cannot be distributed evenly after entering the reactor, and the contact between gas and the solid were not even, so that the crystal form of some particles was not well developed.

Comparative Example 3

A. 2.8 kg LiOH.H$_2$O, 0.65 kg nanometer Al(OH)$_3$ and 6 kg Ni$_{0.8}$Co$_{0.1}$Mn$_{0.1}$(OH)$_2$ (average particle size of 10 micron) were mixed.

B. The obtained mixture was added into a fluidized bed reactor A with a diameter of 0.16 m. The bottom shape of the reactor A was conical, and an incomplete-surrounded heating device was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An incomplete-surrounded heating device was disposed outside the reactor A. The means for heating was radiation heat transmission, by which the heat was transmitted evenly. The solid mixture was heated up gradually by gas-solid heat exchange and surrounded-heating, at a rate of 1-10° C./min until 150° C., and then insulated for 2 h. During the heating process, surface water of the solid and crystal water of lithium salts were gradually removed and the internal material was in fluidized state. The reactor A has a straight pipe body.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Comparative Example 3 was obtained, which was transferred to packaging workshop section by a pneumatic conveying system.

Figure 8:
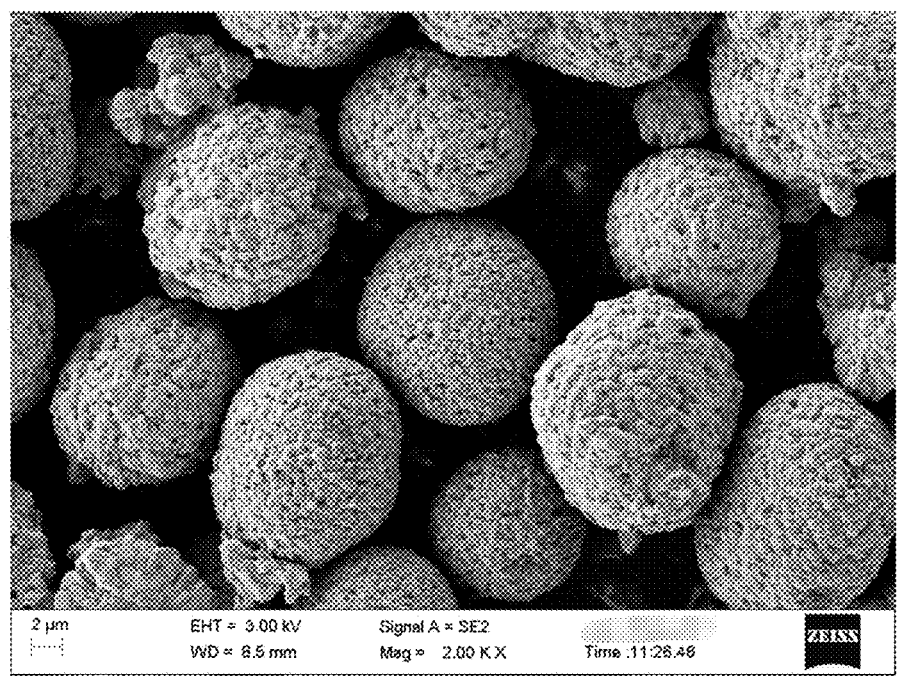
FIG. 8 is a SEM image of the product in Example 3 of the present disclosure.

FIG. 8 is a SEM image of the products in Example 3 of the present disclosure. In Comparative Example 3, the fluidized bed reactor was a straight pipe body without the expansion segment, so that the circulating movement was not formed between internal particles, and interexchange of heat and material between the particles were relatively poor. An incomplete-surrounded heating device was disposed outside the straight pipe body of the reactor. There were relatively large differences between temperatures at different positions. When the particles were circulated inside the reactor, the heating temperatures were different and the concentrations of reacting materials were different. Relative standard deviation of Comparative Example 3 was larger than that of Example 1. It can be seen from SEM image that the sizes of primary particles on the spherical particles were not consistent, and the uniformity of the product was low.

Conditions for detecting the electrochemical performances were: CR2032, 2.7-4.3V vs. Li$^+$/Li@RT.

TABLE 3

Parallel comparison of electrochemical performances of Example 1 and Comparative Example 3

| Sample | Number | Charging at 0.2 C mAh/g | Discharging at 0.2 C mAh/g | Efficiency of the first cycle % | Discharging at 1 C of the first cycle mAh/g | Cycling at 1C for 50 cycles mAh/g | Cycling Retention Rate % |
|---|---|---|---|---|---|---|---|
| Example 1 | 1 | 223.5 | 190.8 | 85.37% | 180.3 | 169.8 | 94.18% |
| | 2 | 224.3 | 192.4 | 85.78% | 181.6 | 170.0 | 93.61% |
| | 3 | 223 | 192.2 | 86.19% | 181.1 | 170.9 | 94.36% |
| | Relative Standard Deviation | 0.6557 | 0.8718 | 0.0041 | 0.6557 | 0.5859 | 0.0039 |
| Comparative Example 3 | 1 | 220.8 | 183.8 | 83.24% | 166.1 | 154.8 | 93.20% |
| | 2 | 216.9 | 179.9 | 82.87% | 165.6 | 143.2 | 86.47% |
| | 3 | 211.4 | 177.5 | 83.98% | 164.6 | 138.3 | 84.02% |
| | Relative Standard Deviation | 4.7226 | 3.1796 | 0.0057 | 0.7638 | 8.4737 | 0.0475 |

Comparative Example 4

A. 2.8 kg LiOH.H$_2$O, 0.65 kg nanometer Al(OH)$_3$ and 6 kg Ni$_{0.8}$Co$_{0.1}$Mn$_{0.1}$(OH)$_2$ (average particle size of 10 micron) were mixed.

B. The obtained mixture was added into a fluidized bed reactor A with a diameter of 0.16 m. The bottom shape of the reactor A was conical. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. The materials were heated up by controlling the temperature of the gas which was heated up at a heating rate of 5° C./min until 150° C. It was detected that the heating rate inside the materials was about 1° C./min. During the heating process, surface water of the solid and crystal water of lithium salts were gradually removed and the internal materials were in fluidized state. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Comparative Example 4 was obtained, which was transferred to packaging workshop section by a pneumatic conveying system.

Figure 9:
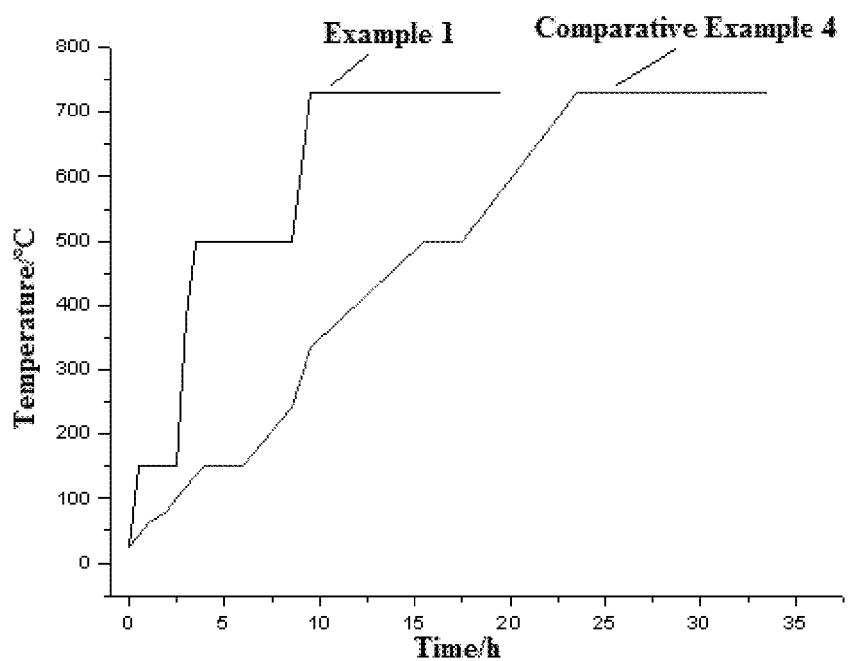
FIG. 9 shows the heating curves of the fluidized bed in Example 1 and Comparative Example 4 of the present disclosure.

FIG. 9 showed the heating curves of the fluidized bed reactor in Example 1 and Comparative Example 4 of the present disclosure. Comparing with Example 1, Comparative Example 4 did not have the entirely-surrounded heating unit, and all the materials were heated by gas. The total reaction time in Comparative Example 4 was 34 h, and the efficiency of reaction was low. While the total reaction time in Example 1 (using an entirely-surrounded heating unit) was 20 h, which was shortened by almost half, and the efficiency of reactor was improved greatly.

Comparative Example 5

A. 2.8 kg $LiOH \cdot H_2O$ and 6 kg $Ni_{0.8}Co_{0.1}Mn_{0.1}(OH)_2$ (average particle size of 10 micron) were mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 1-10° C./min until 150° C., and then insulated for 2 h. During the heating process, surface water of the solid and crystal water of lithium salts were gradually removed and the material was in fluidized state. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h. The resultant was discharged into a high-speed mixer and 0.65 kg nanometer $Al(OH)_3$ was added for coating and then subjected to calcination again at 600° C. A lithium transition metal oxide of Comparative Example 5 was obtained, which was transferred to packaging workshop section by a pneumatic conveying system.

Figure 10:
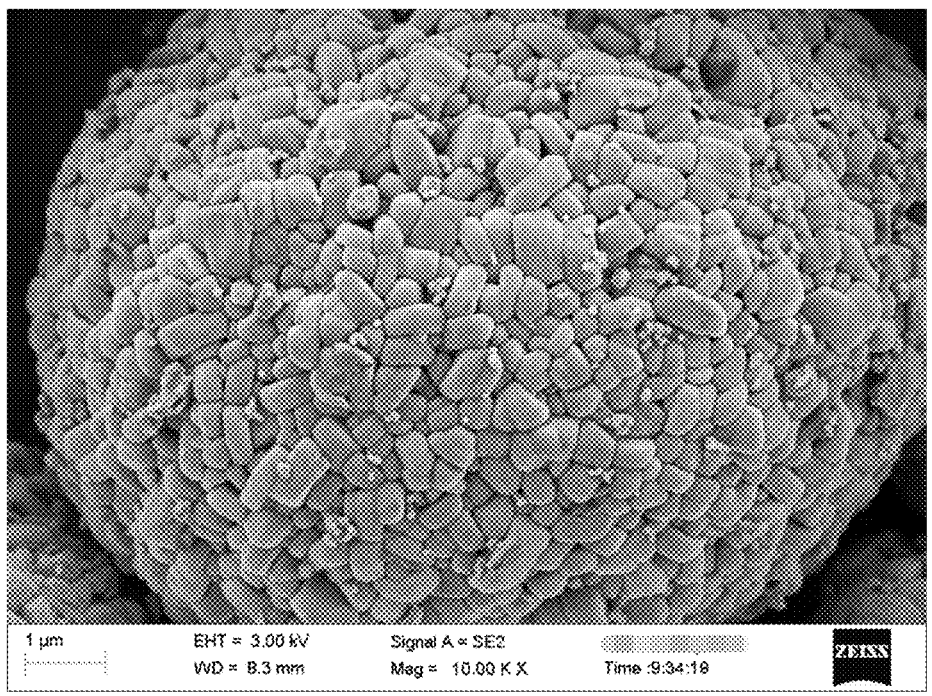
FIG. 10 is a SEM image of the product in Example 1 of the present disclosure.
Figure 11:
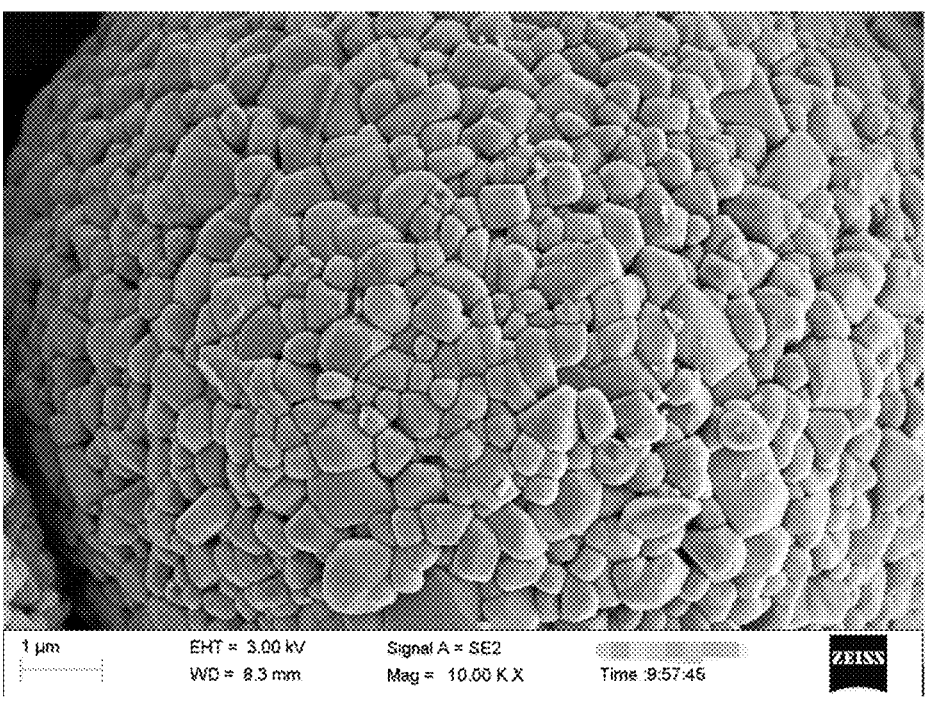
FIG. 11 is a SEM image of the product in Comparative Example 5 of the present disclosure.
Figure 12:
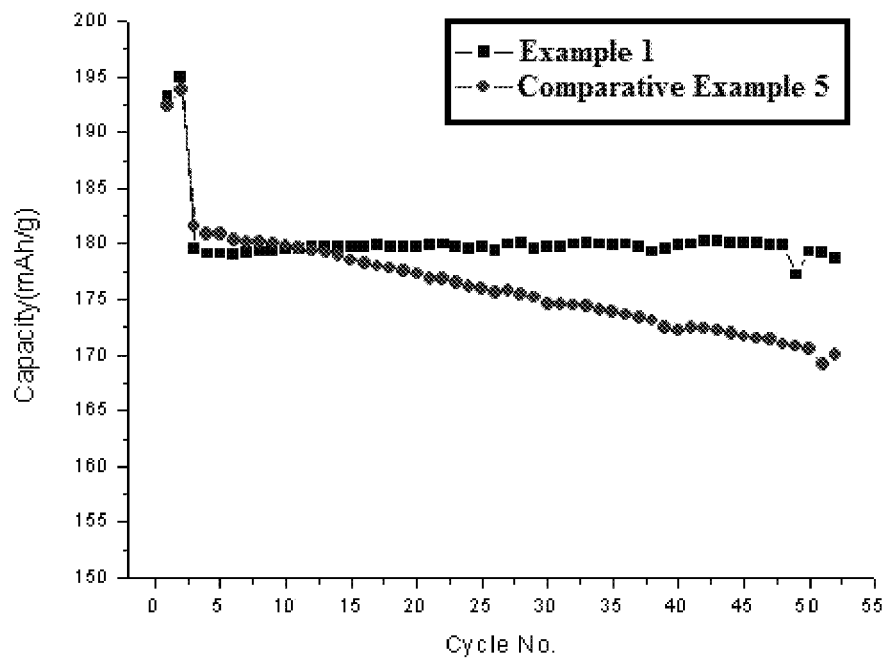
FIG. 12 shows cycle performance of capacity per gram of products in Example 1 and Comparative Example 5 of the present disclosure.

FIG. 10 was SEM image of the product in Example 1 of the present disclosure. FIG. 11 was SEM image of the product in Comparative Example 5 of the present disclosure. FIG. 12 showed cycle performance of capacity per gram of products in Example 1 and Comparative Example 5 in the present disclosure. It can be seen from FIGS. 10-12 that using fluidized bed technology can make the contact between oxygen-containing chemical particles and the lithium transition metal oxides more thoroughly. Comparing with the conventional method used in Comparative Example 5, the coating of Example 1 was more evenly, and the materials have better circulation performance.

Comparative Example 6

A. 2.8 kg $LiOH \cdot H_2O$ and 6 kg $Ni_{0.8}Co_{0.1}Mn_{0.1}(OH)_2$ (average particle size of 10 micron) were mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 1-10° C./min until 150° C., and then insulated for 2 h. During the heating process, surface water of the solid and crystal water of lithium salts were gradually removed and the material was in fluidized state. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Comparative Example 6 was obtained, which was transferred to packaging workshop section by a pneumatic conveying system.

Figure 13:
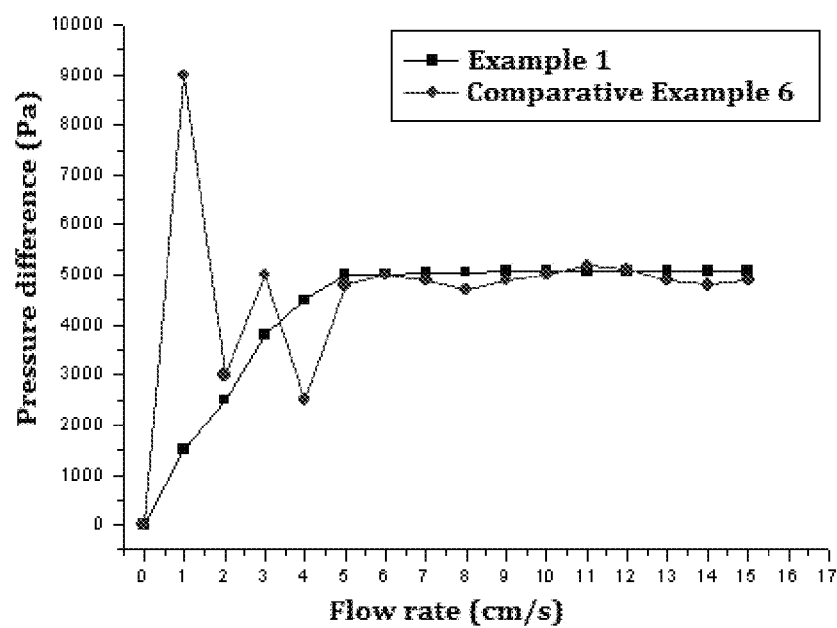
FIG. 13 is a comparison diagram of pressure differences during precalcination, the first calcination and the second calcination between Example 1 and Comparative Example 6 of the present disclosure.

FIG. 13 is a comparison diagram of pressure differences during precalcination, the first calcination and the second calcination of Example 1 and Comparative Example 6 in the present disclosure. It can be seen from FIG. 13 that in Comparative Example 6, there was no doping of oxygen-containing metal compound. Comparing with Example 1, piston channeling was formed at a low velocity; when the materials were fluidized at a high velocity, the pressure fluctuation was relatively large, and the status of liquid level was not stable. The result demonstrates that adding oxygen-containing metal compound improves the fluidization performances of micron-level powders.

Comparative Example 7

A. 2.8 kg LiOH.H$_2$O, 0.65 kg nanometer Al(OH)$_3$ and 6 kg Ni$_{0.8}$Co$_{0.1}$Mn$_{0.1}$(OH)$_2$ (average particle size of 10 micron) were mixed.

B. The obtained mixture was added into a fluidized bed reactor A with a diameter of 0.16 m. A cyclone separator was disposed inside the reactor A. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 5° C./min until 150° C., and then insulated for 2 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Comparative Example 7 was obtained, which was transferred to packaging workshop section by a pneumatic conveying system.

In the present disclosure, products of Example 1 and Comparative Example 7 were subjected to detection of magnetic foreign body, and the results were shown in Table 4. The cyclone separator in Comparative Example 7 was disposed inside the reactor. Due to the material of the cyclone separator could not meet the requirements of alkali-resisting and anti-high temperature simultaneously, the obtained product had a relatively high content of magnetic foreign bodies.

TABLE 4

Detection of magnetic foreign body in products of Example 1 and Comparative Example 7

| Number | Magnetic foreign body Fe/ppm | Magnetic foreign body Cu/ppm | Test method |
|---|---|---|---|
| Example 1 | 11 | 0 | ICP |
| Comparative Example 7 | 200 | 0 | ICP |

Comparative Example 8

A. 2.8 kg LiOH.H$_2$O, 0.65 kg nanometer Al(OH)$_3$ and 6 kg Ni$_{0.8}$Co$_{0.1}$Mn$_{0.1}$(OH)$_2$ (average particle size of 10 micron) were mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 5° C./min until 150° C., and then insulated for 2 h. During the heating process, surface water of the solid and crystal water of lithium salts were gradually removed. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h.

D. The materials obtained in step C was conveyed to a fluidized bed reactor C. The fluidized bed reactor C and the fluidized bed reactor B had the same size and structure. By adjusting the airflow velocity to 15 cm/s, setting the calcination temperature to 730° C. and the calcination time to 14 h, a lithium transition metal oxide of Comparative Example 8 was obtained, which was transferred to packaging workshop section by a pneumatic conveying system.

In the present disclosure, electrochemical performances of the products obtained in Example 1 and Comparative Example 8 were detected. Conditions for electrochemical tests were: CR2032, 2.7-4.3V vs. Li+/Li@RT. The results were shown in Table 5. It can be concluded from Table 5 that comparing with Comparative Example 8, calcination time of Example 1 reduced from 14 h to 10 h, improving the production efficiency, saving the energy consumption, and the lithium loss on ignition in the calcination process was reduced. The electrochemical performances of the material were improved.

TABLE 5

Electrochemical performances of products in Example 1 and Comparative Example 8

| Number | Charging at 0.2 C mAh/g | Discharging at 0.2 C mAh/g | Efficiency of the first cycle % | Discharging at 1 C of the first cycle mAh/g | Cycling at 1C for 50 cycles mAh/g | Cycling Retention Rate % |
|---|---|---|---|---|---|---|
| Example 1 | 223.4 | 191.8 | 85.85 | 180.7 | 169.4 | 93.75 |
| Comparative Example 8 | 218 | 184.3 | 84.55 | 178.2 | 160.6 | 90.10 |

Example 4

A. 2.8 kg $LiOH \cdot H_2O$ and 6 kg $Ni_{0.8}Co_{0.1}Mn_{0.1}(OH)_2$ (average particle size of 10 micron) were mixed.

B. The obtained mixture was added into a fluidized bed reactor A with a diameter of 0.16 m. The bottom shape of the reactor A was conical, and an entirely-surrounded heating unit was disposed outside the reactor A. The mixture was filled in the reactor A like a column as a bed layer with a depth of 0.5 m. When the temperature was raised up, the high purity oxygen was passed through a preheating device and flowed inside the reactor. The high purity oxygen was mixed at the bottom of the reactor, and then mixed with the solid particles thoroughly. Then the airflow velocity was adjusted to 5 cm/s to fluidize the materials. An entirely-surrounded heating unit was disposed outside the reactor A. The means for heating was radiation heat transmission, by which the heat was transmitted evenly. The solid mixture was heated up gradually by gas-solid heat exchange and surrounded-heating, at a rate of 1-10° C./min until 150° C., and then insulated for 2 h. During the heating process, surface water of the solid and crystal water of lithium salts were gradually removed, and the material was in fluidized state. An expansion segment was disposed on the upper part of the reactor A. The deposition of the internal materials happened in the expansion segment, so the materials were circulated and mixed continuously.

C. The materials obtained in step B were conveyed to a fluidized bed B through a tube. The fluidized bed reactor B and the fluidized bed reactor A had the same size and structure. After the process of step B, the airflow velocity may be adjusted to 10 cm/s to realize stable fluidization. The pressure fluctuation was detected and the value fluctuated within the range of ±100 pa. The calcination temperature was set to 500° C. and the calcination time was 5 h. During the calcination process, 0.65 kg $Al(OH)_3$ (main-group metal compound containing oxygen) was gradually added until the reaction was completed, which accounted for 0.5% of the total molar ratio.

D. The material obtained in step C was transferred to a fluidized bed reactor C. The fluidized bed reactor C and the fluidized bed reactor B had the same size and structure. By adjusting the airflow velocity to 15 cm/s, setting the calcination temperature to 730° C. and the calcination time to 10 h, a lithium transition metal oxide of Example 4 was obtained, which was transferred to packaging workshop section by a pneumatic conveying system.

In the present disclosure, products of Example 1 and Example 4 were subjected to XRD and electrochemical performances tests.

Figure 14:
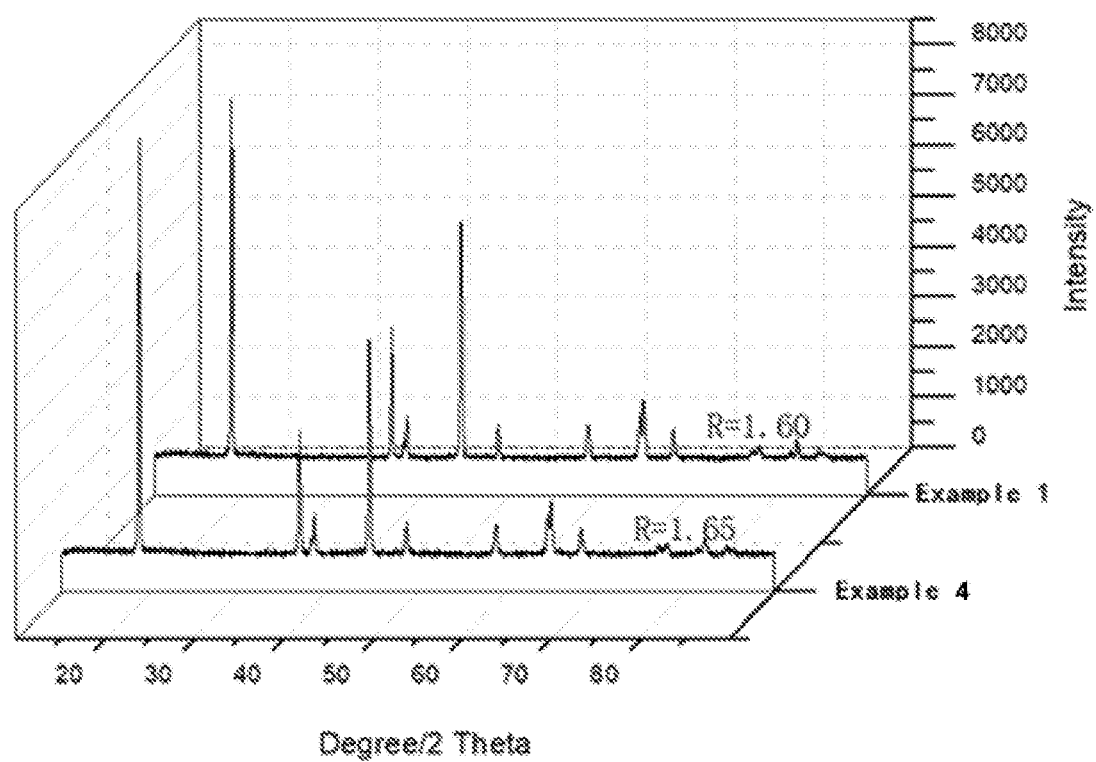
FIG. 14 is XRD spectrogram of Example 1 and Example 4 of the present disclosure.

Comparison results of XRD were shown in FIG. 14. It can be concluded from the figure that R value of Example 4 was obviously larger than that of Example 1, indicating that the crystal form of Example 4 was well developed.

Conditions for electrochemical tests were: CR2032, 2.7-4.3V vs. Li+/Li@RT. The results were shown in Table 6. It can be concluded from Table 6 that the relative standard deviation in the electrochemical performances of products obtained in Example 4 were lower than that of Example 1, indicating that the uniformity of product in Example 4 was improved.

TABLE 6

Electrochemical performances of products in Example 1 and Example 3

| Sample | Number | Charging at 0.2 C mAh/g | Discharging at 0.2 C mAh/g | Efficiency of the first cycle % | Discharging at 1 C of the first cycle mAh/g | Cycling at 1 C for 50 cycles mAh/g | Cycling Retention Rate % |
|---|---|---|---|---|---|---|---|
| Example 1 | 1 | 223.5 | 190.8 | 85.37% | 180.3 | 169.8 | 94.18% |
|  | 2 | 224.3 | 192.4 | 85.78% | 181.6 | 170.0 | 93.61% |
|  | 3 | 223 | 192.2 | 86.19% | 181.1 | 170.9 | 94.36% |
|  | Relative Standard Deviation | 0.6557 | 0.8718 | 0.0041 | 0.6557 | 0.5859 | 0.0039 |
| Example 3 | 1 | 222 | 192 | 86.49% | 181.5 | 171.2 | 94.33% |
|  | 2 | 221.6 | 191.7 | 86.51% | 180.8 | 170.9 | 94.52% |
|  | 3 | 222.5 | 192.8 | 86.65% | 182 | 172.1 | 94.56% |
|  | Relative Standard Deviation | 0.4509 | 0.5686 | 0.0009 | 0.6028 | 0.6245 | 0.0013 |

The above descriptions are only preferred embodiments of the present disclosure. It should be noted that a number of modifications and refinements may be made by one of ordinary skills in the art without departing from the principles of the disclosure, and such modifications and refinements are also considered to be within the scope of protection of the present disclosure.

The invention claimed is:

1. A method for producing lithium transition metal oxide, comprising:

A) mixing a lithium salt and a precursor, and adding a resultant mixture into a reactor for precalcination;

the lithium salt has a median particle size D50 of 10-20 μm and the precursor has a median particle size D50 of 1-20 μm, and the precursor is one or more selected from the group consisting of transition metal oxyhydroxide, transition metal hydroxide and transition metal carbonate; and B) adding a product obtained from the precalcination into a fluidized bed reactor, subjecting to a first calcination and a second calcination successively to obtain the lithium transition metal oxide; and raw material for preparing the lithium transition metal oxide further includes $Al(OH)_3$, which is added after the addition of the lithium salt and the precursor in the first calcination; and the main-group metal compound containing oxygen has an average particle size of 10-100 nm;

an expansion segment is provided in the upper part of the fluidized bed reactor;

an entirely-surrounded heating unit is provided outside the fluidized bed reactor; and the fluidized bed reactor has a diameter of 0.1-10 m, and the expansion segment has a diameter of 0.1-20 m.

2. The method according to claim 1, wherein a temperature of the precalcination is 50-150° C., and a duration of the precalcination is 1-10 h.

3. The method according to claim 1, wherein a mole ratio of the amount of the lithium salt, the precursor and the main-group metal compound containing oxygen is (1.01-1.10):1:(0.001-0.01).

4. The method according to claim 1, wherein
   in the precalcination, an airflow velocity of the fluidized bed reactor is 1-10 cm/s,
   in the first calcination, an airflow velocity of the fluidized bed reactor is 5-15 cm/s; and
   in the second calcination, an airflow velocity of the fluidized bed reactor is 10-20 cm/s.

5. The method according to claim 1, wherein a temperature of the first calcination is 150-800° C., and a duration of the first calcination is 2-10 h.

6. The method according to claim 1, wherein a temperature of the second calcination is 500-1000° C., and a duration of the second calcination is 5-20 h.

7. The method according to claim 1, wherein
   the shape of the bottom sealing head of the fluidized bed reactor is spherical, ellipsoidal, circular or conical; an air intake port is provided above the bottom sealing head; and the opening of the air intake port is towards the bottom sealing head of the fluidized bed reactor; and
   an air outlet tube and a cyclone separator are provided at the top of the fluidized bed reactor, and the exit of the air outlet tube is connected to the cyclone separator.

8. The method according to claim 7, wherein a lining is provided inside the fluidized bed reactor, and the lining is a ceramic lining.

* * * * *